United States Patent

Patel et al.

[11] Patent Number: 5,820,164
[45] Date of Patent: Oct. 13, 1998

[54] ENERGY ABSORBING SEAT BELT COMPONENT FASTENER

[75] Inventors: Rasik Patel, Canton; Francis Joseph Wickenheiser, Monroe, both of Mich.

[73] Assignee: Ford Global Technologies, Inc., Dearborn, Mich.

[21] Appl. No.: 834,186

[22] Filed: Apr. 15, 1997

[51] Int. Cl.⁶ .................................................. B60R 22/00
[52] U.S. Cl. .................. 280/808; 280/801.1; 280/805; 297/470; 297/471; 297/468; 297/483
[58] Field of Search ........................... 280/801.1, 808, 280/805; 297/470, 471, 468, 483, 486, 472

[56] References Cited

U.S. PATENT DOCUMENTS

| | | |
|---|---|---|
| Re. 32,524 | 10/1987 | Temple . |
| 3,957,282 | 5/1976 | Finnigan . |
| 4,560,204 | 12/1985 | Zeumer et al. . |
| 4,564,219 | 1/1986 | Baden et al. . |
| 4,573,708 | 3/1986 | Brorsson . |
| 4,834,427 | 5/1989 | Takada . |
| 4,878,692 | 11/1989 | Ando et al. ............................. 280/804 |
| 5,096,224 | 3/1992 | Murakami et al. . |
| 5,215,332 | 6/1993 | De Sloovere . |
| 5,427,412 | 6/1995 | Staniszewski .......................... 280/808 |
| 5,529,344 | 6/1996 | Yasui et al. . |
| 5,685,566 | 11/1997 | Hirase et al. ........................ 280/801.1 |

FOREIGN PATENT DOCUMENTS

| | | | |
|---|---|---|---|
| 2428814 | 2/1976 | Germany ............................... 280/808 |
| 3627087 A1 | 3/1988 | Germany . |
| 8-192720 | of 1995 | Japan . |
| 1 497 397 | 4/1975 | United Kingdom . |
| 2 263 620 | 8/1993 | United Kingdom . |
| 2275175 | 8/1994 | United Kingdom .................. 280/805 |

*Primary Examiner*—Christopher P. Ellis
*Attorney, Agent, or Firm*—Daniel M. Stock

[57] ABSTRACT

An energy absorbing mounting fastener assembly is provided for a seat belt component particularly a seat belt sling assembly 22 which includes an energy absorbing member 46, 47 carried with a mounting bolt 32 for pivotally mounting the seat belt component with the energy absorbing member being retained between the mounting bolt head and the seat belt component and providing an access aperture 63 for tool engagement with the bolt 32 at a pocket 64.

5 Claims, 2 Drawing Sheets

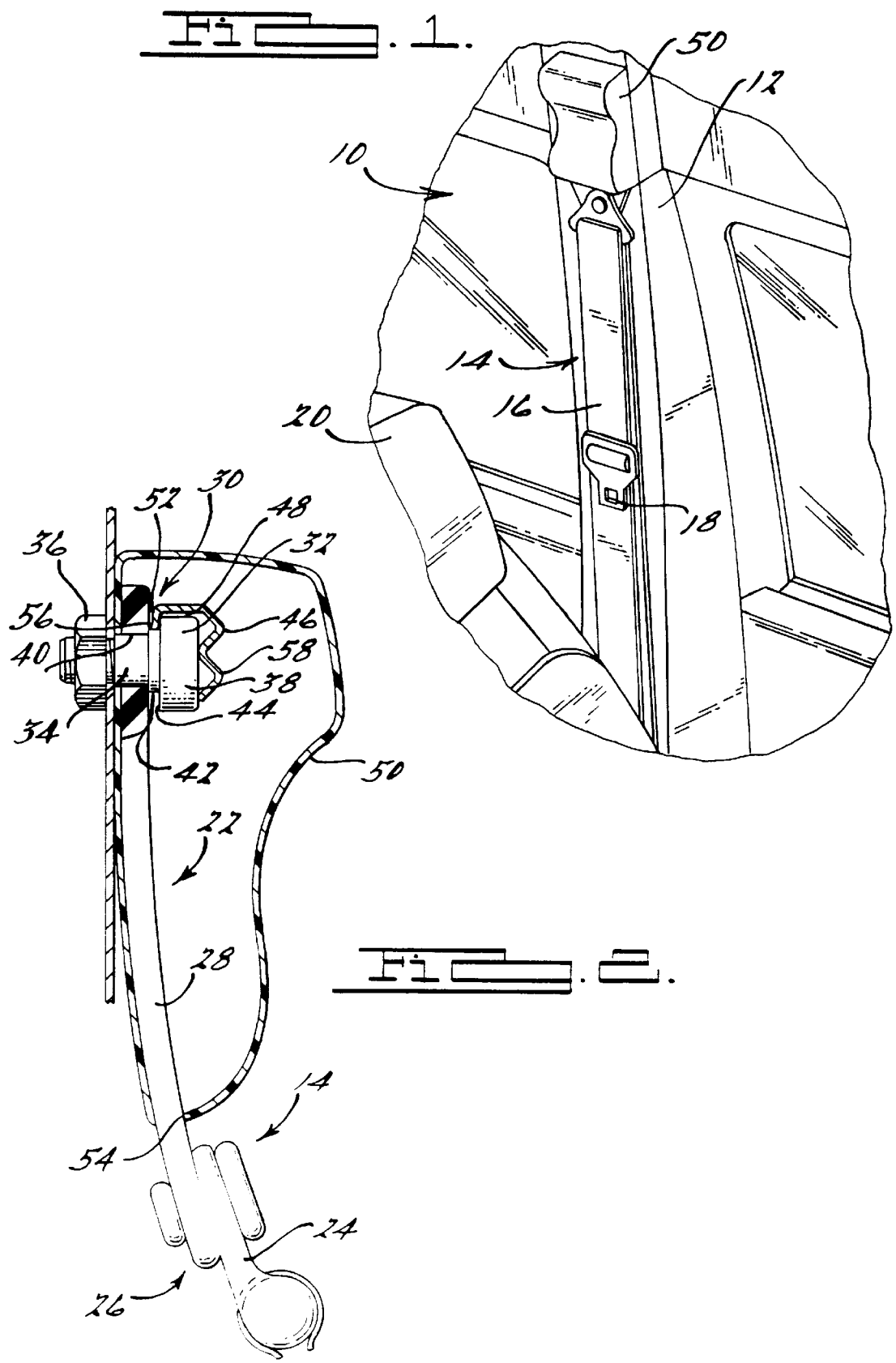

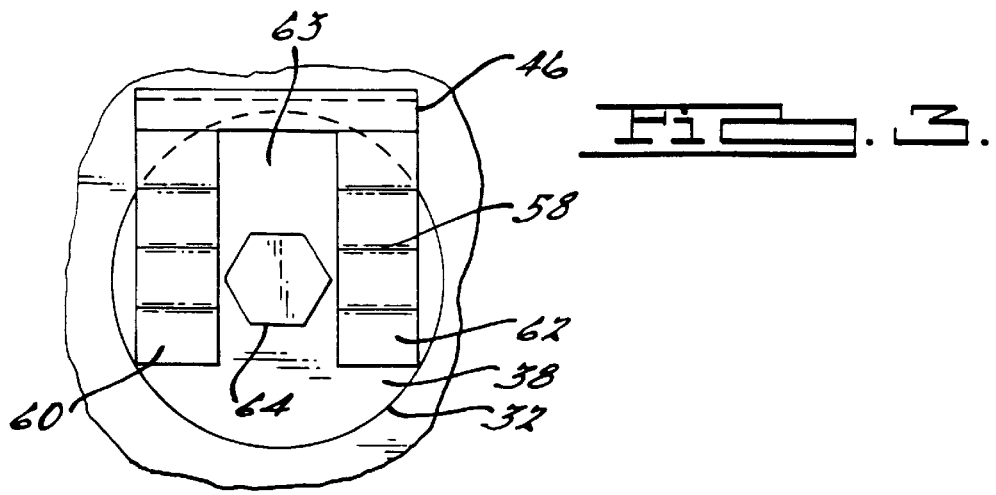
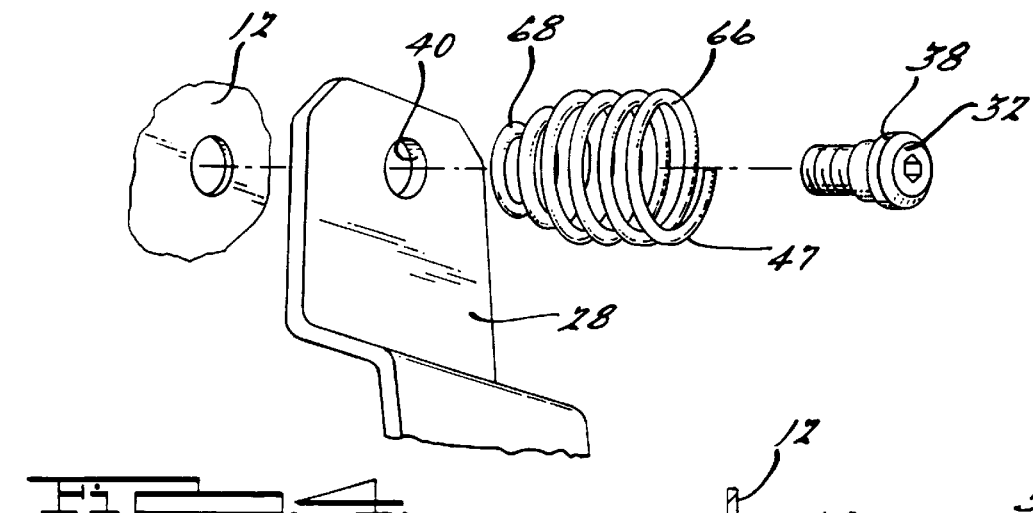
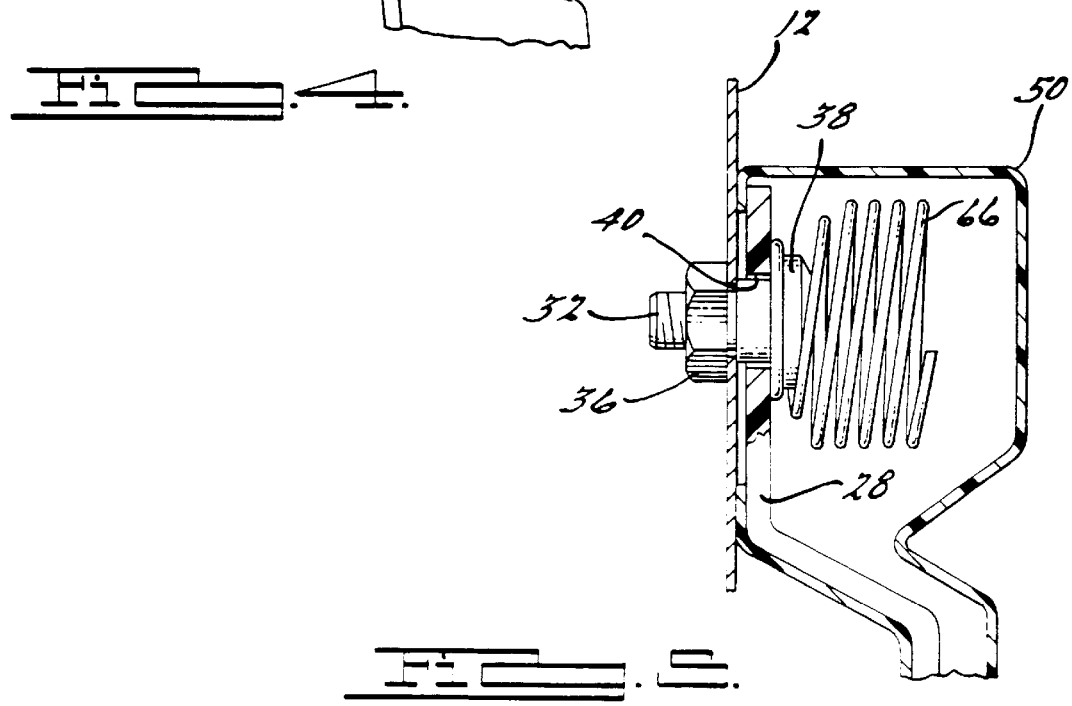

5,820,164

ENERGY ABSORBING SEAT BELT COMPONENT FASTENER

BACKGROUND OF THE INVENTION

1. Technical Field

The present invention relates generally to automotive seat belt components, and more particularly to fasteners for mounting such components.

2. Description of Related Art

The desirability of cushioning interior surfaces of automobiles is well known in the automotive arts. Among the components of primary importance in considering the cushioning of such interior components, are the bolts which are used to fasten seat belt components to the body of a vehicle. In some designs, the cushioning of the bolt with respect to the interior of the vehicle has been accomplished through structure carried with the interior trim of the vehicle in facing relationship with the head of the bolt. U.S application Ser. No. 08/587,054, assigned to the assignee of the present invention, is exemplary of such an approach. Other energy absorption designs have involved energy absorbing structure underneath the head of the bolt. U.S. Pat. No. 5,529,344, is exemplary of these approaches.

Not demonstrated in the prior art but considered to be desirable is an energy absorbing bolt mounting structure that will accommodate securing a bolt in fixed manner to an automotive vehicle body while the energy absorbing structure is secured to the bolt and nevertheless permitting pivotal mounting of the seat belt component with respect to the bolt.

SUMMARY OF THE INVENTION

The present invention overcomes the shortcomings of the prior art by providing an energy absorbing fastener assembly for mounting the seat belt component for pivotal movement with respect to an automotive vehicle body interior panel which includes a bolt secured to the vehicle body interior panel having a shank portion for pivotally mounting the seat belt component and a head portion that presents an annular shoulder against which an energy absorbing member is positioned to present a resilient portion inboard of the bolt head while remaining secured against the annular shoulder of the bolt head for retention.

According to a feature of the invention, the energy absorbing member defines an aperture for permitting access to a central drive pocket in the head portion of the bolt.

BRIEF DESCRIPTION OF THE DRAWINGS

This advantageous feature and others will be appreciated by reading the following description with reference to the accompanying drawing, in which:

FIG. 1 is an interior perspective view of a portion of an automotive vehicle body in which a seat belt component is mounted according to the present invention;

FIG. 2 is a cross sectional view illustrating the energy absorbing mounting assembly of the present invention;

FIG. 3 is an enlarged view of the energy absorbing member of the energy absorbing fastening assembly of the present invention;

FIG. 4 is an exploded view of an alternative embodiment of the energy absorbing fastener assembly of the present invention; and FIG. 5 is a cross sectional view of the assembly of FIG. 4.

DESCRIPTION OF THE PREFERRED EMBODIMENTS

Turning now to the drawings, and in particular to FIG. 1 thereof, an automotive vehicle interior indicated generally at 10 includes a body having interior panels, such as the upper pillar 12, to which is secured an upper portion of the seat belt assembly 14. The illustrated seat belt assembly 14 is of the three point mounting type which include a belt 16 having a buckle tongue 18 that may be donned in a known manner about an occupant of the seat 20.

Turning now to FIG. 2, the seat belt assembly indicated generally at 14 is illustrated as further including a sling assembly 22 having a D-ring 24 pivotally mounted at the lower end 26 of an elongated sling 28. The upper end 30 of the sling 28 is pivotally mounted through a bolt 32 to the upper pillar 12. The bolt 32 includes a shank 34 and may be secured to the panel 12 as through the nut indicated at 36 and is made axially fast against the panel 12 and positions its head 38 interiorly of the vehicle 10. The shank 34 is received through an aperture 40 proximate the upper end 30 of the sling 28 for pivotally mounting the sling with respect to the vehicle body. The inner end 42 of the shank 34 and enlarged head 38 define an annular shoulder 44. An energy absorbing member, such as a clip 46 defining a channel 48 received over the head 38 to be retained between the sling 28 and the annular shoulder 44. A trim cover 50 overlies the bolt 32 and the energy absorbing member or clip 46 and may in fact be retained exteriorly of the sling 28 as indicated at 52. An aperture 54 at the bottom of the trim cover 50 provides for swingable movement of the elongated strap or sling 28.

The clip member 46 advantageously includes a retainer arm 56 which may be bent, as indicated in FIG. 2, to axially compressively engage between the head 38 of the bolt 32 and the sling member 28.

Projecting axially of the bolt and interiorly of the vehicle, a resilient energy absorbing portion of the clip indicated at 58 is provided. In the preferred embodiment of FIGS. 2 and 3, this resilient energy absorbing member is a W-shaped member and is preferably formed as a pair of W-shaped arms indicated at 60, 62 in FIG. 3. The arms 60, 62 are spaced laterally about a drive pocket 64 formed in the head 38 of the bolt 32. This arrangement of the clip 46 with respect to the bolt 32 assures that tool access for driving the bolt into engagement with the nut 36 or other device for mounting with respect to the vehicle interior panel 12, can be accommodated through the aperture 63 between the arms 60, 62. When the clip member 46 is installed over the head 38 of the bolt 32, the bolt 32 may be driven into engagement with the nut 36, compressing the bent-over portion 56 between the head 38 and the sling 28. This effects a robust design that permits the pivotal movement of the sling 28 while providing axial loading against the possibility of rattling.

Turning now to FIGS. 4 and 5, an alternative embodiment for energy absorbing member 47 is provided in which a helical compression spring 66 having at least one reduced diameter coil 68 at one end is provided the reduced diameter coil 68 is received under the head 38 of the bolt 32 in the same fashion as the bent-over portion 56 of the clip member 46 of the previously described embodiment. As with the previously described device, the energy absorbing member is retained between the head 38 of the bolt 32 and the sling 28, permitting pivotal movement of the sling with respect to the vehicle body panel 12.

While only two embodiments of the energy absorbing fastener assembly of the present invention have been described, others may occur to those skilled in the automotive body restraint arts without departing from the scope of the following claims.

We claim:

1. An energy absorbing fastener assembly for mounting a seat belt component for pivotal movement with respect to an automotive vehicle body interior panel, the fastener assembly comprising:
  a bolt fixedly secured to the vehicle body interior panel, the bolt having a shank portion with a first diameter projecting inwardly of the vehicle body interior panel for pivotally mounting the seat belt component and an enlarged head portion at the inner end of the shank portion defining an annular shoulder adjacent the shank portion and an annular end face at its outer end and having an inwardly facing drive pocket formed therein; and
  an energy absorbing member positioned against the bolt head portion annular shoulder and having a resilient portion projecting axially inwardly beyond the bolt head portion and including an access aperture in registration with the drive pocket.

2. An energy absorbing fastener assembly as defined in claim 1, wherein the bolt has a central drive pocket in the head portion end face and the energy absorbing member defines a tool receiving aperture in registration with the drive pocket.

3. An energy absorbing fastener assembly as defined in claim 1, wherein the energy absorbing member comprises a spring clip defining a channel receiving the bolt head and having a resilient retaining arm abuttingly engaging the bolt head portion annular shoulder and a W-shaped resilient member engaging the bolt head portion end face.

4. An energy absorbing fastener assembly as defined in claim 1, wherein the W-shaped resilient member comprises a pair of W-shaped arms spaced laterally about the bolt head portion drive pocket.

5. An energy absorbing fastener assembly as defined in claim 1, wherein the energy absorbing member comprises a helical compression spring having a reduced diameter coil on one end thereof retained against the bolt head portion annular shoulder, the remainder of the spring receiving the bolt head portion in surrounding relationship.

\* \* \* \* \*